Patented Oct. 15, 1940

2,217,849

UNITED STATES PATENT OFFICE 2,217,849

COMPOUNDS OF THE ANTHRAQUINONE SERIES

Frederic Bennett Stilmar, Woodstown, N. J., assignor to E. I. du Pont de Nemours & Company, Wilmington, Del., a corporation of Delaware No Drawing. Application March 25, 1939, Serial No. 264,125

5 Claims. (Cl. 260—329)

This invention relates to the preparation of new compounds of the anthraquinone series. It relates more particularly to the preparation of new thiophenanthrone carboxylic acid derivatives that are valuable for the synthesis of acidylaminoanthraquinone dyestuffs of modified shades in the yellow to red range and of enhanced brightness.

In U. S. Patents 2,049,214 and 1,931,196 carboxylic acids of 1:9-thiophenanthrone are described which are capable of being condensed with aminoanthraquinones to give dyestuffs that exhibit good dyeing properties. I have found that by introducing a ketonic radical on the C-atom of the thiophene ring of 1:9-thiophenanthrone-2-carboxylic acid that dyes may be obtained on further condensation with aminoanthraquinones which are not only modified in shade but which exhibit brightness of color not obtainable from the unsubstituted thiophenanthrone carboxylic acids.

It is therefore an object of this invention to prepare new dyestuff intermediates of 1:9-thiophenanthrone-2-carboxylic acid which give dyestuffs that dye in bright and desirable shades and which exhibit good dyeing and fastness properties.

According to my invention 1-mercapto-2-anthraquinone carboxylic acid disodium salt is condensed with an alpha halogen ketone of the type

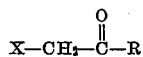

in which X stands for halogen, and R stands for a radical of the class consisting of alkyl radicals containing from 1 to 5 carbon atoms and radicals of the benzene series. Ring closure takes place simultaneously with the condensation to give after acidification compounds of the formula

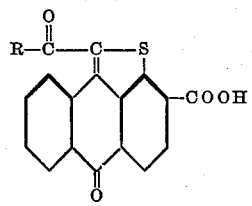

in which R has the same significance as above.

This carboxylic acid may be converted to the acid chloride by conventional methods such as by the use of phosphorus pentachloride, or thionylchloride in organic solvents.

The following examples are given to illustrate the invention. The parts used are by weight.

Example 1

150 parts of 1-chloro-2-anthraquinone carboxylic acid are dissolved in a solution of 24 parts sodium hydroxide in 1050 parts water. There is then added a solution of 90 parts sulfur dissolved in 1125 parts of twenty percent sodium sulfide solution. The mixture is boiled to one-half the volume, and the resulting mercapto salt crystallizes out. This is filtered at room temperature, and then washed with twenty percent salt solution.

The mercaptan cake thus obtained is then suspended in 2000 parts water with 40 parts sodium carbonate, and 58.1 parts of chloroacetone are slowly added under agitation. The violet color soon disappears and after heating to 50° C., the solution is filtered from small amounts of impurity, and then acidified with acetic acid. The bright yellow product is filtered, washed with water and dried. It dissolves in concentrated sulfuric acid with a bluish-red color, and has the formula

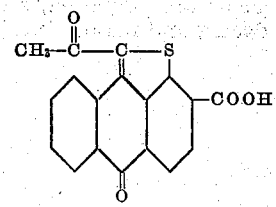

The acid chloride of this compound may be prepared as follows: 24.5 parts of finely ground C-acetyl-1:9-thiophenanthrone-2-carboxylic acid as prepared above are suspended in 120 parts of ortho-dichlorbenzene and 19.3 parts of phosphorous-pentachloride are added. The reaction mass is heated to 110–115° C. for ½ hour. After cooling the greenish yellow product is filtered off and washed with o-dichlorbenzene.

Example 2

150 parts of 1-chloro-2-anthraquinone carboxylic acid are converted to the mercaptan as described in Example 1. The mercaptan cake is suspended in 2000 parts of water with 30 parts of sodium carbonate. There is added, with agitation, a solution of 83.7 parts omega chloroacetophenone dissolved in 250 parts of alcohol.

The reaction mass is heated to 90° C., filtered from a slight residue, and acidified with acetic acid. The bright yellow product is filtered off, washed with water and dried. The product which gives a red color in concentrated sulfuric acid has the following probable formula

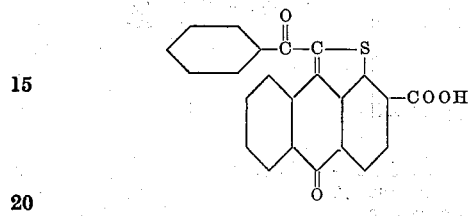

*Example 3*

150 parts of 1-chloro-2-anthraquinone carboxylic acid are converted to the mercaptan as described in Example 1, and then suspended in 2000 parts of water. To this suspension there is added with vigorous agitation 41.3 parts of 1-chloro-2-butanone. The violet color soon disappears and the reaction mass is then acidified with 100 parts of acetic acid. The precipitate is filtered off, washed with water and dried. The product is a yellow solid dissolving in concentrated acid with a bluish-red color. It has the formula

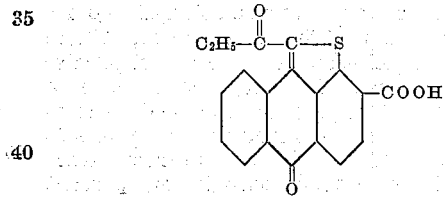

Similar compounds are obtained when other halogen-ketones of the aliphatic and aromatic series, such as 1-chloro-2-heptanone, and chloroacetophenone carrying halogen, methyl, or methoxy substituents in the aryl ring, are substituted for those mentioned in the specific examples.

I have found that on condensing these new C-substituted-1,9-thiophenanthrone-2-carboxylic acid chlorides with aminoanthraquinone derivatives that brighter colors are obtained than when the known unsubstituted 1:9-thiophenanthrone-2-carboxylic acids are employed, and that they exhibit good dyeing and fastness properties.

In the processes above specifically illustrated the corresponding potassium salts, and the alpha bromo ketones may be employed as the starting materials.

I claim:
1. Compounds of the following formula

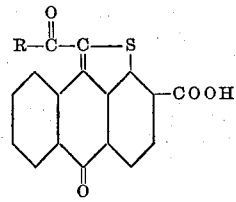

in which R stands for a substituent of the group consisting of alkyl radicals containing from 1 to 5 carbon atoms and aryl radicals of the benzene series containing not more than one benzene ring, said radicals being attached to the carbonyl radical directly thru carbon to carbon linkages.

2. Compounds of the following formula

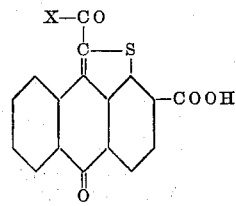

wherein X stands for an alkyl radical containing from 1 to 5 carbon atoms which are attached to the carbonyl radical directly thru carbon to carbon linkages.

3. Compounds of the following formula

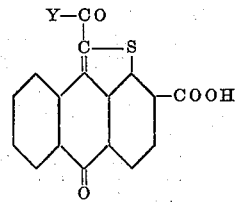

in which Y stands for an aryl radical of the benzene series which contains not more than 1 benzene ring and which is attached to the carbonyl radical directly thru carbon to carbon linkages.

4. C-acetyl-1,9-thiophenanthrone-2-carboxylic acid.

5. C-benzoyl-1,9-thiophenanthrone-2-carboxylic acid.

FREDERIC BENNETT STILMAR.